(12) United States Patent
Peng et al.

(10) Patent No.: US 8,188,629 B2
(45) Date of Patent: May 29, 2012

(54) MAGNETIC TRANSMISSION ASSEMBLY

(75) Inventors: Ming-Tsan Peng, Taoyuan County (TW); Li-Ju Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 73 days.

(21) Appl. No.: 12/763,751

(22) Filed: Apr. 20, 2010

(65) Prior Publication Data

US 2011/0215667 A1   Sep. 8, 2011

(30) Foreign Application Priority Data

Mar. 3, 2010 (TW) .............................. 99106193 A (51) Int. Cl.
 *H02K 49/00* (2006.01)
 *H02P 15/00* (2006.01)
(52) U.S. Cl. ........ 310/103; 310/190; 310/191; 310/209; 310/114
(58) Field of Classification Search .................. 310/103, 310/190, 191, 209, 114
 See application file for complete search history.

(56) References Cited

U.S. PATENT DOCUMENTS

| | | | | |
|---|---|---|---|---|
| 2,959,041 A * | 11/1960 | Scheller et al. | ................. | 66/150 |
| 3,889,140 A * | 6/1975 | Baermann | ..................... | 310/103 |
| 3,980,937 A | 9/1976 | Bostrom et al. | | |
| 4,027,229 A * | 5/1977 | Frink | ............................. | 322/50 |
| 4,110,649 A * | 8/1978 | Mas | ............................. | 310/191 |
| 4,578,609 A * | 3/1986 | McCarty | ................. | 310/156.24 |
| 4,766,362 A * | 8/1988 | Sadvary | ........................... | 322/50 |
| 4,785,213 A * | 11/1988 | Satake | .......................... | 310/116 |
| 4,885,493 A * | 12/1989 | Gokhale | ....................... | 310/190 |
| 5,023,499 A * | 6/1991 | Kuwahara | ..................... | 310/105 |
| 5,631,511 A | 5/1997 | Schulmann et al. | | |
| 5,633,555 A | 5/1997 | Ackermann et al. | | |
| 5,652,493 A | 7/1997 | Hendershot, Jr. | | |
| 5,723,928 A * | 3/1998 | Imai et al. | ..................... | 310/114 |
| 5,821,652 A * | 10/1998 | Hyypio | ........................... | 310/83 |

(Continued)

FOREIGN PATENT DOCUMENTS

CN         1304577 A      7/2001

(Continued)

OTHER PUBLICATIONS

Atallah et al., A Novel High-Performance Magnetic Gear, IEEE Transactions on Magnetics, Jul. 2001, vol. 37, No. 4.

*Primary Examiner* — Quyen Leung
*Assistant Examiner* — Alex W Mok
(74) *Attorney, Agent, or Firm* — Morris Manning & Martin LLP; Tim Tingkang Xia, Esq.

(57) ABSTRACT

A magnetic transmission assembly is adapted to integration with a motor or generator. The magnetic transmission assembly includes a rotor, a stator, and a magnetically conductive element. The rotor and the stator are sleeved coaxially and respectively have R and ST1 pole pairs. The magnetically conductive element is located between the rotor and the stator, and has steel pieces. When the magnetically conductive element is actuated, the magnetically conductive element selectively enables PN1 or PN2 steel pieces to be corresponding to the rotor and the stator. The steel pieces corresponding to the rotor and the stator interact with magnetic fields of the R and ST1 pole pairs to generate a predetermined variable-speed ratio. The magnetic transmission assembly can be integrated into the motor, so as to improve the drive power density.

11 Claims, 10 Drawing Sheets

U.S. PATENT DOCUMENTS

| | | | |
|---|---|---|---|
| 5,821,710 A * | 10/1998 | Masuzawa et al. | 318/400.41 |
| 5,825,111 A * | 10/1998 | Fei | 310/179 |
| 5,856,719 A * | 1/1999 | De Armas | 310/103 |
| 6,380,653 B1 * | 4/2002 | Seguchi | 310/112 |
| 6,700,242 B2 * | 3/2004 | Kawamura | 310/68 R |
| 6,720,692 B2 * | 4/2004 | Bell | 310/85 |
| 7,400,077 B2 * | 7/2008 | Caroon | 310/266 |
| 7,508,104 B2 * | 3/2009 | Schmidt et al. | 310/104 |
| 7,511,395 B2 * | 3/2009 | Han et al. | 310/114 |
| 7,598,648 B2 | 10/2009 | Fei | |
| 7,956,504 B2 * | 6/2011 | Quere | 310/114 |
| 7,982,353 B2 * | 7/2011 | Wilson et al. | 310/181 |
| 7,999,427 B2 * | 8/2011 | Wilson et al. | 310/83 |
| 2001/0005106 A1 * | 6/2001 | Bell | 310/254 |
| 2004/0135463 A1 * | 7/2004 | Maguire et al. | 310/262 |
| 2005/0040724 A1 * | 2/2005 | Maguire et al. | 310/179 |
| 2005/0104469 A1 * | 5/2005 | Zepp et al. | 310/191 |
| 2005/0121990 A1 * | 6/2005 | Kaneko | 310/156.47 |
| 2005/0212380 A1 * | 9/2005 | Caroon | 310/266 |
| 2007/0096574 A1 * | 5/2007 | Romagny et al. | 310/112 |
| 2007/0149335 A1 * | 6/2007 | Strauss et al. | 475/5 |
| 2008/0149445 A1 * | 6/2008 | Kern et al. | 192/3.56 |
| 2009/0072645 A1 * | 3/2009 | Quere | 310/114 |
| 2009/0127963 A1 * | 5/2009 | Ai et al. | 310/191 |
| 2009/0295250 A1 * | 12/2009 | Nakanishi et al. | 310/191 |

FOREIGN PATENT DOCUMENTS

| | | |
|---|---|---|
| CN | 1980016 A | 6/2007 |
| CN | 101222172 A | 7/2008 |
| CN | 201328057 Y | 10/2009 |
| WO | 2010017860 A1 | 2/2010 |

* cited by examiner

MAGNETIC TRANSMISSION ASSEMBLY

CROSS-REFERENCE TO RELATED APPLICATIONS

This non-provisional application claims priority under 35 U.S.C. §119(a) on Patent Application No(s). 099106193 filed in Taiwan, R.O.C. on Mar. 3, 2010, the entire contents of which are hereby incorporated by reference.

BACKGROUND

1. Field

The present invention relates to a transmission assembly, and more particularly to a magnetic transmission assembly.

2. Related Art

A transmission device not only can be used for power transmission and delivery, but also has the function of accelerating or decelerating the rotation of a power source. Transmission devices applied in conventional automobile engines include mechanical and hydraulic gear boxes. Magnetic transmission devices are applied in electric or hybrid automobiles.

For technologies of variable speed motors, reference is made to U.S. Pat. No. 3,980,937 entitled "Fractional Horsepower Gear Motor" issued on Sep. 14, 1976, in which a power output by a motor is transmitted through a mechanical gear assembly so as to achieve torque conversion and transmission.

In addition, U.S. Pat. No. 5,825,111 entitled "Single-phase induction motor 4/6 pole common winding connection with magnetic motive force symmetrically distributed" issued on Dec. 20, 1998, and U.S. Pat. No. 7,598,648 entitled "2/6 pole single-phase induction motor having shared windings" issued on Dec. 6, 2009, disclose methods of achieving variable speed transmission by changing the number of poles of a stator of a induction motor.

For technologies related to magnetic transmission device, reference is made to an article "A Novel High-Performance Magnetic Gear" (IEEE Transactions on Magnetics, Vol. 37, No. 4, July, 2001) by K. Atallah and D. Howe.

The mechanical transmission device has disadvantages of high noise level and heavy weight. Although the ordinary magnetic transmission device has reduced vibration and noise level, its weight also cannot be reduced. Moreover, when applied in an electric automobile, an electric motor not only needs to meet the requirements of different output torques and travel speeds, but also needs to meet the requirements of high performance operation. Accordingly, the motor is usually combined with a transmission device. In such a combination, it is quite difficult to improve the overall drive power density of the motor and the transmission device (due that the total weight of the motor and the transmission device is heavy).

SUMMARY

In view of the above problems, a magnetic transmission assembly is disclosed. The magnetic transmission assembly can be easily integrated into a motor (such as an electric motor) or generator to achieve a light weight design. The integrated motor improves the drive power density.

According to an embodiment, a magnetic transmission assembly comprises a rotor, a stator, and a magnetically conductive element. The rotor is sleeved coaxially with the stator. The rotor has a plurality of poles and R pole pairs. The stator has a plurality of poles and ST1 pole pairs. The magnetically conductive element is located between the rotor and the stator and has a plurality of steel pieces. When the magnetically conductive element is actuated, the magnetically conductive element selectively makes PN1 or PN2 steel pieces correspond to the rotor and the stator, where $PN1-3 \leq R+ST1 \leq PN1+3$, and $PN2-3 \leq R+ST1 \leq PN2+3$.

According to an embodiment of the magnetically conductive element, the magnetically conductive element comprises a first ring and a second ring. The first ring and the second ring are axially connected. The first ring has PN1 magnetically conductive blocks. The second ring has PN2 magnetically conductive blocks. When the magnetically conductive element is axially actuated, the magnetically conductive element selectively enables the first ring or the second ring to be moved to a position between the rotor and the stator.

According to another embodiment of the magnetically conductive element, the magnetically conductive element comprises a first ring and a second ring. The first ring is disposed on a radial outer side of the second ring. The first ring and the second ring are disposed between the stator and the rotor. When the magnetically conductive element is actuated, the first ring and the second ring move relatively between a first position and a second position. When the first ring and the second ring are located at the first position, the magnetically conductive element has PN1 steel pieces. When the first ring and the second ring are located at the second position, the magnetically conductive element has PN2 steel pieces.

According to another embodiment, the stator comprises a plurality of induction coils and a pole number modulation circuit. The induction coils are energized to form the poles, and the pole number modulation circuit selectively switches the induction coils to the ST1 pole pairs and ST2 pole pairs. Here, $PN2-3 \leq R+ST2 \leq PN2+3$.

According to still another embodiment, a magnetic transmission assembly comprises a rotor, a stator and a magnetically conductive element. The stator has a plurality of poles and the poles have R pole pairs. The stator is sleeved coaxially with the rotor and has a plurality of poles. The poles of the stator have ST1 pole pairs. The magnetically conductive element is disposed between the rotor and the stator and has PN1 steel pieces. The PN1 steel pieces correspond to the rotor and the stator. $PN1-3 \leq R+ST1 \leq PN1+3$.

As mentioned above, the magnetically conductive element is disposed between the stator and the rotor, and the magnetically conductive element is capable of selectively changing the number of the steel pieces (accordingly, also capable of changing the number of magnetic gaps). Accordingly, the magnetic transmission assembly can generates different variable-speed ratios (ratios of the rotation rate of the stator to the rotation rate of the rotor) between the stator and the rotor. Moreover, in another embodiment, the stator is designed to have variable pole pairs, such that different variable-speed ratios can also be achieved by combining the magnetically conductive element with the rotor. The magnetically conductive element, the stator and the rotor may each have a hollow annular shape, such that the entire magnetic transmission assembly has small volume and weight, and can be easily integrated into an electric motor. Consequently, the drive power density (W/Kg or $W/m^3$) of the integrated motor is increased.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
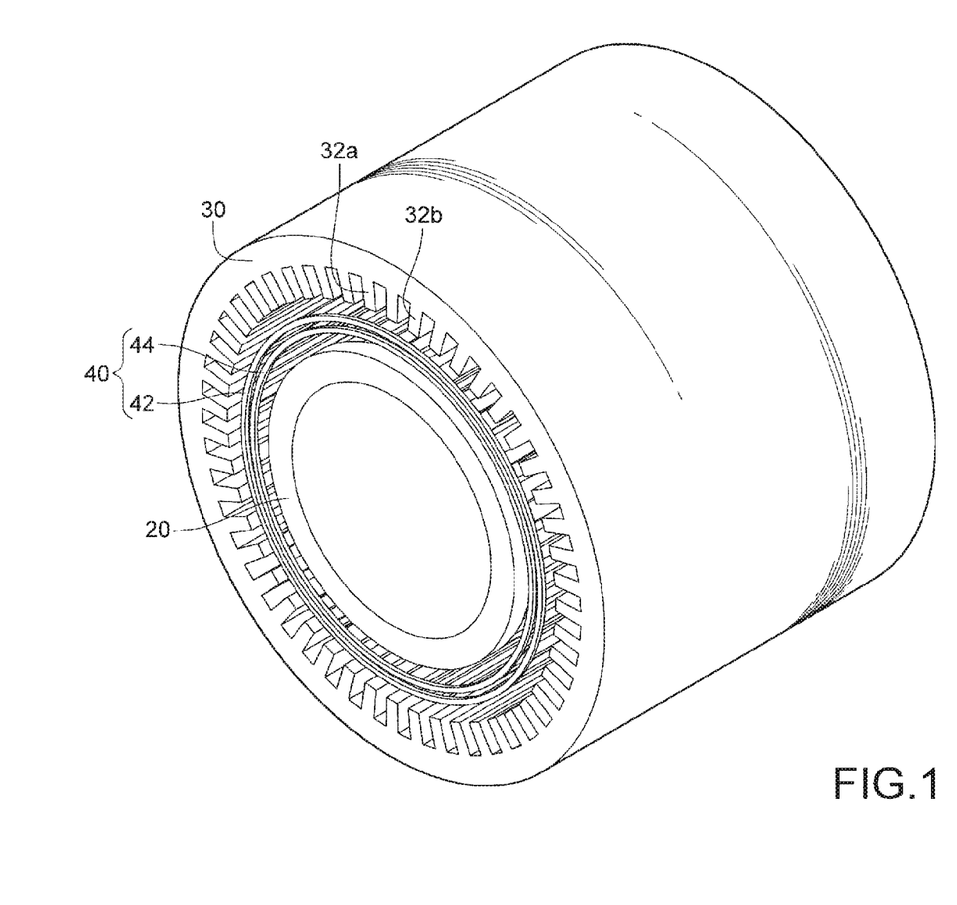
FIG. 1 is a three-dimensional schematic structural view of a magnetic transmission assembly according to an embodiment of the present invention.
Figure 2:
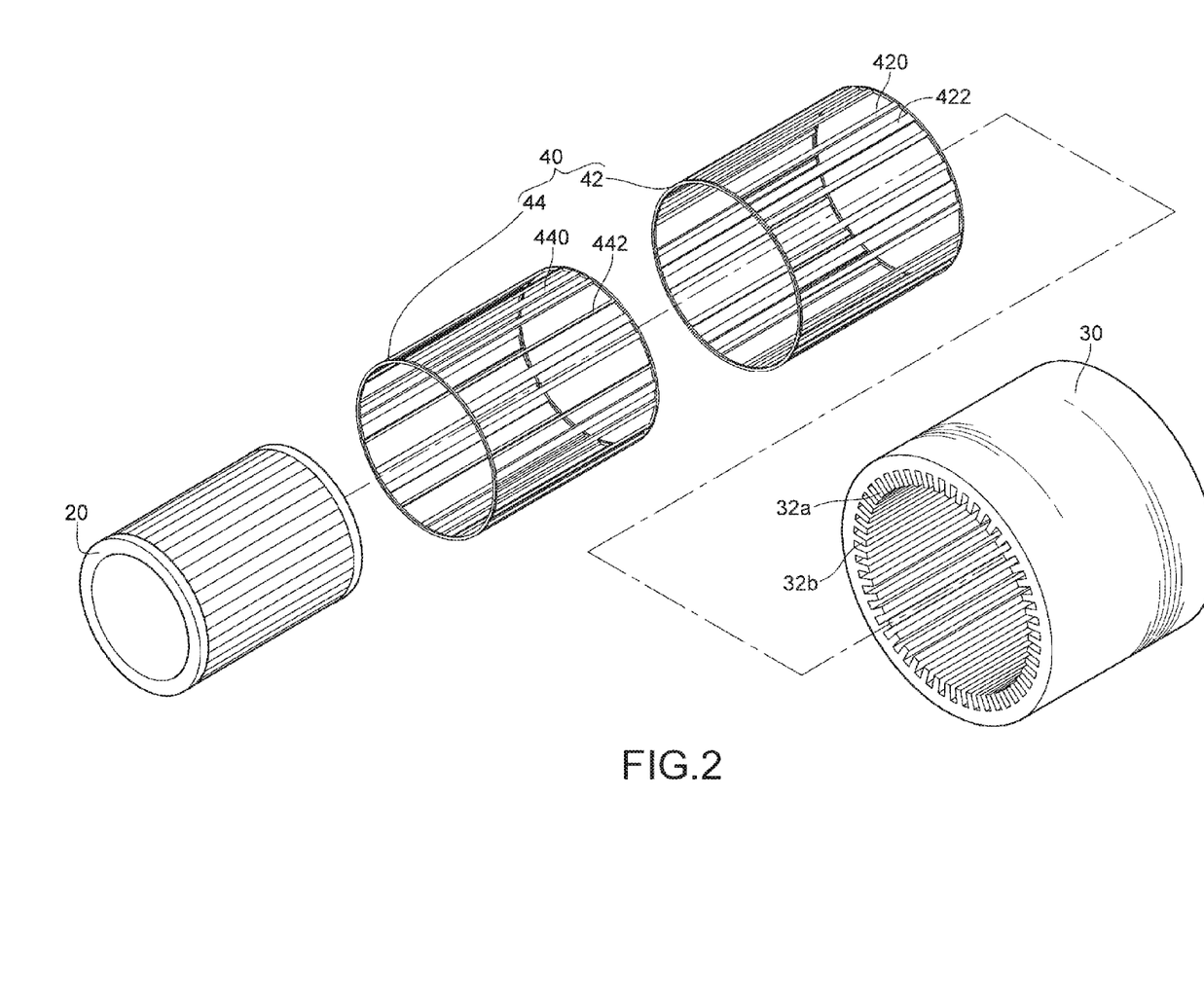
FIG. 2 is a three-dimensional schematic exploded view of a magnetic transmission assembly according to an embodiment of the present invention.

FIGS. 1 and 2 are respectively a three-dimensional schematic structural view and a three-dimensional exploded view according to an embodiment of the present invention. As can be seen from the figures, a magnetic transmission assembly comprises a rotor 20, a stator 30, and a magnetically conductive element 40 (also referred to as a magnetic transmission element). The magnetic transmission assembly is suitable for integration with a motor (such as an electric motor) or generator. For example, if the magnetic transmission assembly is integrated with an electric motor of an electric automobile, and a motor driver outputs an electromotive force to the magnetic transmission assembly, the magnetic transmission assembly can generate a rotary power at the rotor, and at the same time, the motor driver properly controls the variable-speed ratio of the magnetic transmission assembly, such that the magnetic transmission assembly can output different powers (power=output torque×rotation rate). Since the magnetic transmission assembly has the functions of both a motor and a transmission device, the total volume and weight are low, such that a high drive power density can be obtained. Here, the drive power density may be, but not limited to, output power/volume or output power/weight (that is, output torque×rotation rate)/volume, or (output torque×rotation rate)/weight). In addition, if the magnetic transmission assembly is applied in a motor, the rotor 20 receives the rotary power, and thus coils (to be detailed below) of the stator 30 can output an electric power generated by cutting the magnetic field. The electric power may be transmitted to a rectification and voltage regulation circuit and then output. Since the magnetic transmission assembly may be controlled to generate the variable-speed ratio, a controller may be used to adjust the variable-speed ratio of the magnetic transmission assembly when the input rotary power is significantly changed or it is intended to obtain better system conversion efficiency.

Figure 3:
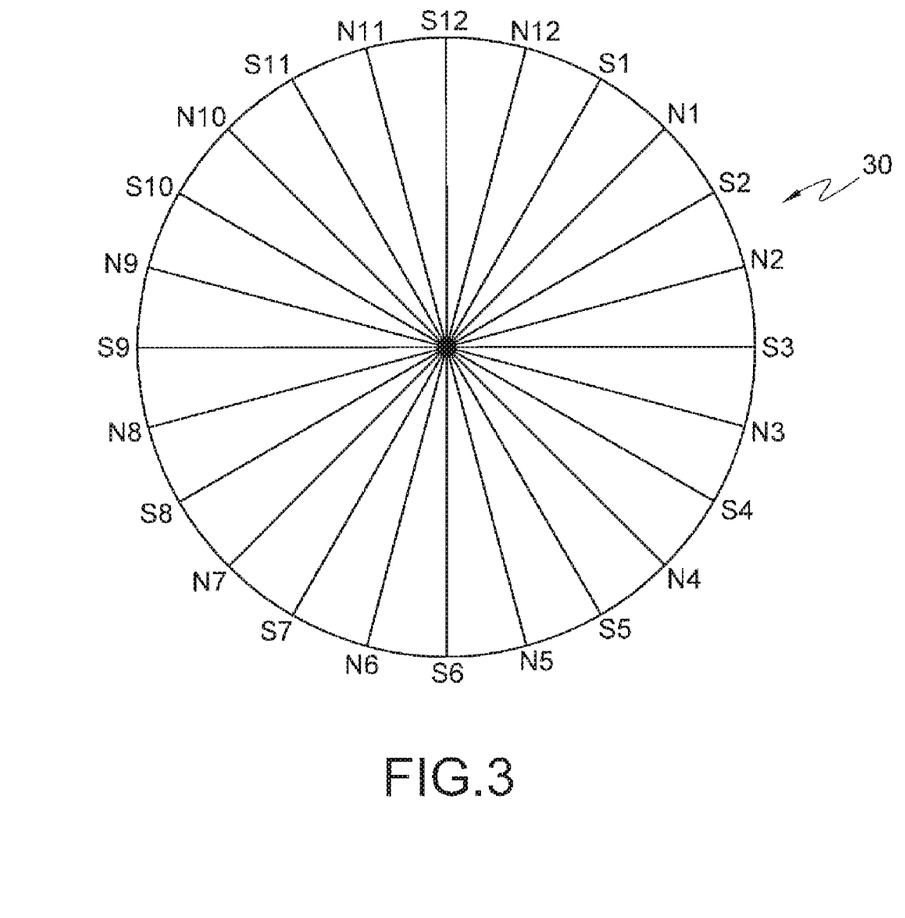
FIG. 3 is a schematic view illustrating pole pairs of a stator of a magnetic transmission assembly according to an embodiment of the present invention.

Referring to FIGS. 1 and 2, the stator 30 may be a fixed magnet or an induction magnet, and in this embodiment, the induction magnet is taken as an example. A plurality of bumps 32a, 32b is annularly disposed on an inner side of the stator 30. Induction coils (to be detailed below) are wound around the bumps 32a, 32b, and the induction coils are energized to form poles. Taking the embodiment as shown in the figures, the stator 30 has 48 bumps 32a, 32b, and each of the bumps 32a, 32b can be energized to form one pole pair. In this embodiment, 4 phases exist, each having 12 pole pairs. FIG. 3 is a schematic view illustrating pole pairs of a stator 30 according to an embodiment of the present invention. As can be seen from the figure, neighboring poles have opposite polarities (north magnetic pole N and south magnetic pole S). Two neighboring poles having opposite polarities form a pole pair (for example, S1 and N1 form a pole pair as shown in the figure). As can be seen from the figure, a total of 12 pole pairs exists, which is merely an implementation, and the present invention is not limited thereto, and the number of the pole pairs is represented by ST1.

The rotor 20 may be may be a fixed magnet or an induction magnet, and in this embodiment, the rotor 20 is illustrated by taking the fixed magnet as an example. The rotor 20 has a plurality of poles and R pole pairs, and in this embodiment, the rotor 20 has, for example, 20 pole pairs. The stator 30 and the rotor 20 are disposed coaxially (sleeved coaxially), and in this embodiment, the rotor 20 is disposed on a radial inner side of the stator 30, but the present invention is not limited thereto. The objectives of the present invention can also be achieved by disposing the stator 30 on a radial inner side of the rotor 20. In addition, the direction of the poles (magnetic field lines) of the rotor 20 is in the direction of the poles (magnetic field lines) of the stator 30.

Referring to FIGS. 1 and 2, the magnetically conductive element 40 comprises a first ring 42 (or called as first sleeve) and a second ring 44 (or called as second sleeve). The first ring 42 is located on a radial outer side of the second ring 44, and the first ring 42 and the second ring 44 are disposed between the stator 30 and the rotor 20. The first ring 42 and the second ring 44 are in contact with each other or separated from each other by a space (the latter is implemented in the figure). The first ring 42 has a plurality of magnetically conductive blocks 420, 422. The second ring 44 also has a plurality of magnetically conductive blocks 440, 442. When the first ring 42 is located on the radial outer side of the second ring 44, the magnetically conductive blocks 420, 422, 440, 442 form a plurality of steel pieces (to be detailed below). When the first ring 42 or/and the second ring 44 are actuated, the first ring 42 and the second ring 44 move relatively (rotate relatively) between a first position and a second position, and at this time, the number of the steel pieces is changed accordingly, which is illustrated as follows.

Figure 4A:
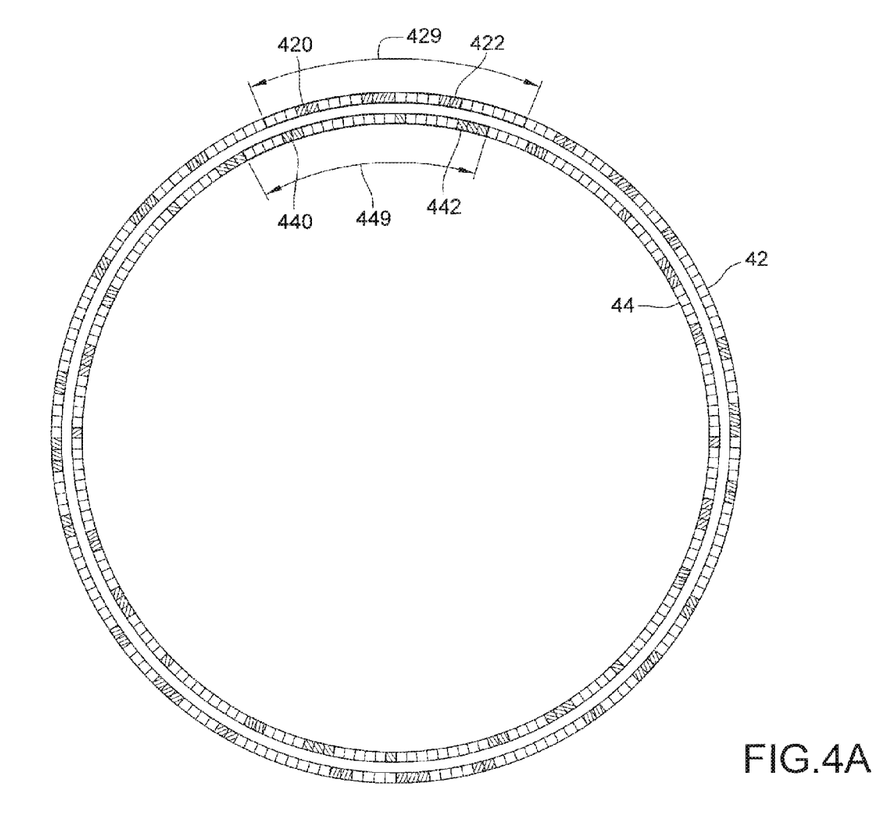
FIG. 4A is a cross-sectional view of a magnetically conductive element of a magnetic transmission assembly according to an embodiment of the present invention.
Figure 4B:
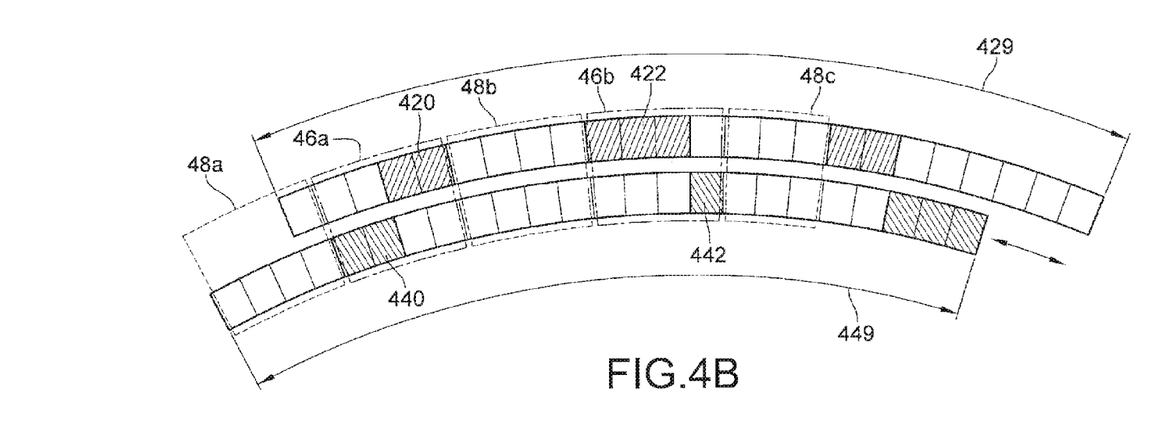
FIG. 4B is a partially enlarged cross-sectional view of the magnetically conductive element of FIG. 4A.
Figure 4C:
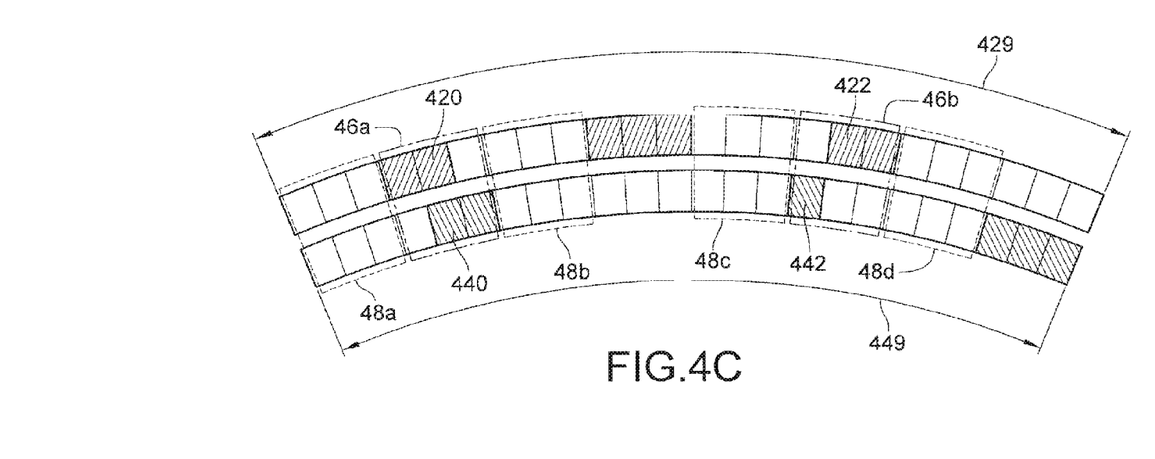
FIG. 4C is another partially enlarged cross-sectional view of the magnetically conductive element of FIG. 4A.

FIG. 4A is a cross-sectional view of a magnetically conductive element according to an embodiment of the present invention, which is taken along a plane perpendicular to an axial direction after the first ring 42 is sleeved on the radial outer side of the second ring 44 in FIG. 2. For ease of illustration of the relative rotation of the first ring 42 and the second ring 44, arc segments marked 429 and 449 in FIG. 4A are enlarged in FIG. 4B. The arc segments 429, 449 subtend an angle of 45°, so the first ring 42 and the second ring 44 have 8 arc segments 429, 449 in total. FIG. 4B is a partially enlarged cross-sectional view when the first ring 42 and the second ring 44 are located at the first position. FIG. 4C is a partially enlarged cross-sectional view when the first ring 42 and the second ring 44 are located at the second position.

As can be seen from FIG. 4B, the magnetically conductive block 420 of the first ring 42 and the magnetically conductive block 440 of the second ring 44 are in a connection state (or overlap) and form the steel piece 46a. Likewise, the magnetically conductive block 422 of the first ring 42 and the magnetically conductive block 442 of the second ring 44 are in a connection state and form the steel piece 46b. Three magnetic gaps 48a, 48b, 48c are formed between the steel pieces 46a, 46b. Since the first ring 42 and the second ring 44 have four equal 8 arc segments 429, 449, the first ring 42 and the second ring 44 have 24 magnetic gaps 48a, 48b, 48c in total (3×8=24, that is, have 24 steel pieces 46a, 46b).

Referring to FIG. 4C, a partially enlarged cross-sectional view when the first ring 42 and the second ring 44 are located at the second position is shown. The magnetically conductive block 420 of the first ring 42 and the magnetically conductive block 440 of the second ring 44 are in a connection state and form the steel piece 46a. Likewise, the magnetically conductive block 422 of the first ring 42 and the magnetically conductive block 442 of the second ring 44 are in a connection state and form the steel piece 46b. As can be seen from the figure, the arc segments 429, 449 have four magnetic gaps 48a, 48b, 48c, 48d therein, and also have four steel pieces 46a, 46b. Therefore, the first ring 42 and the second ring 44 have 32 (4×8=32) magnetic gaps 48a, 48b, 48c, 48d in total.

The connection state between the magnetically conductive blocks 420, 440 refers to a close distance there-between, instead of referring to a contact state, and the close distance may also mean that the magnetically conductive blocks 420, 440 are not in contact but overlap each other in a radial direction, or the magnetically conductive blocks 420, 440 are not in contact but are separated by a space in a radial direction or in a circumferential direction. In other words, if the magnetically conductive blocks 420, 440 are not in contact, two distances exist between the magnetically conductive blocks 420, 440: one is a radial distance, and the other is a circumferential distance. As for the radial distance, it has been found through experiments that a single steel piece 46a can be formed, as long as the radial distance is less than 5 mm. Definitely, the distance is also related to the intensity of the magnetic field lines of the stator 30, and the higher the intensity of the magnetic field lines is, the larger the distance may be. That is to say, the radial distance may be changed according to the size of the motor and the intensity of the magnetic field lines.

The circumferential distance (arc length) may also be expressed as an angle between borders of the magnetically conductive blocks 420, 440 at a center of circle (center of the stator), for example, an angle between a left side edge of the magnetically conductive block 420 and a right side edge of the magnetically conductive block 440 as shown in FIG. 4B. In order to further define the angle or arc length, a space formed by a distance between the left side edge of the magnetically conductive block 420 and the right side edge of the magnetically conductive block 440 is defined as an air slot. When the magnetic transmission assembly operates, each of the magnetic gaps 48a, 48b, 48c (FIG. 4B) will generate a pole (referred to as an air gap pole below), and when the magnetically conductive blocks 420, 440 has an air slot, the air slot will also have a pole (referred to as an air slot pole below). In this case, in order to enable the magnetically conductive blocks 420, 440 to form the steel piece 46a, the magnetic intensity of the air slot pole is preferably smaller than 20% of the magnetic intensity of the air gap pole. Then, the arc length or the angle derived from the magnetic intensity of the air slot pole is a preferred circumferential distance.

The material of the magnetically conductive blocks 420, 422, 440, 442 may be any magnetically conductive material, for example, an iron-based material or soft iron. The relative rotation of the first ring 42 and the second ring 44 may be driven by a mechanical or electromagnetic method. In the driving method, the first ring 42 or the second ring 44 may be separately driven, or the first ring 42 and the second ring 44 may be concurrently driven, as long as the relative positions of the first ring 42 and the second ring 44 can be moved between the first position and the second position.

It can be known from the illustration of FIGS. 4B and 4C that, when the magnetically conductive element 40 is actuated, the first ring 42 and the second ring 44 move relatively between the first position (position of FIG. 4B) and the second position (position of FIG. 4C), and when the first ring 42 and the second ring 44 are located at the first position, the magnetically conductive element 40 has 24 (referred to as PN1 below) steel pieces 46a, 46b, and when the first ring 42 and the second ring 44 are located at the second position, the magnetically conductive element 40 has 32 (referred to as PN2 below) steel pieces 46a, 46b.

By designing the first ring 42 and the second ring 44 of the magnetically conductive element 40 to be capable of relative movement, the magnetically conductive element 40 can selectively enable the PN1 or PN2 steel pieces 46a, 46b to be corresponding to the rotor 20 and the stator 30. By combining the PN1 or PN2 steel pieces 46a, 46b with the magnetic field of the rotor 20 and the magnetic field of the stator 30, an acceleration or deceleration (transmission) effect can be generated. The acceleration ratio or deceleration ratio can be obtained by the following Equation (1):

$$G = \frac{mp}{|mp + kn|} \quad \text{Equation (1)}$$

In the equation, G is the variable-speed ratio (that is, the acceleration to deceleration ratio), m and k are stages of harmonics, p is the number of pole pairs of the rotor 20, and n is the number of the steel pieces 46a, 46b. For fundamental harmonics, m=−k=1, and in this embodiment, the number of the pole pairs of the rotor 20 is 20. Taking the case that the first ring 42 and the second ring 44 are located at the first position as an example, the number of the steel pieces is 24. By substituting the numbers into the above equation, it can be obtained that G=(1×20)/(1×24−1×20)=5, that is, the ratio of the rotation rate of the stator to the rotation rate of the rotor is 5:1. If the case that the first ring 42 and the second ring 44 are located at the second position is taken as an example, the number of the steel pieces is 32. By substituting the numbers into the above equation, it can be obtained that G=(1×20)/(1×32−1×20)=1.6, that is, the ratio of the rotation rate of the stator to the rotation rate of the rotor is 1.6:1.

As can be seen from the above, through suitable configuration and design of the magnetically conductive element 40, the stator 30 and the rotor 20, the magnetic transmission assembly can be enabled to have a transmission effect.

In addition, in order to further improve the stability of the variable-speed ratio, it can be obtained through experiments that if the number ST1 of the pole pairs of the stator 30, the number R of the pole pairs of the rotor 20, and the numbers PN1 and PN2 of the steel pieces 46a, 46b of the magnetically conductive element 40 are maintained in the following relation, stable variable-speed ratio and driving force can be obtained:

$$PN1-3 \leq R+ST1 \leq PN1+3 \quad \text{Equation (2)}$$

$$PN2-3 \leq R+ST1 \leq PN2+3 \quad \text{Equation (3)}$$

Taking this embodiment as an example, when the magnetically conductive element 40 is located at the second position, the Equation (3) PN2−3 R+ST1 PN2+3 is satisfied, and when the magnetically conductive element 40 is located at the first position, the requirements of transmission can be met, though the Equation (2) PN1−3 R+ST1 PN1+3 is not satisfied. In this embodiment, if it is intended to satisfy the Equations (2) and (3) at the same time, the design of the magnetically conductive blocks 420, 422, 440, 442 of the magnetically conductive element 40 may be modified to satisfy the Equation (2). For example, if ST1 is 12, and PN1 and PN2 are respectively 35 and 29, and the above Equations (2) and (3) can be satisfied at the same time.

Figure 5A:
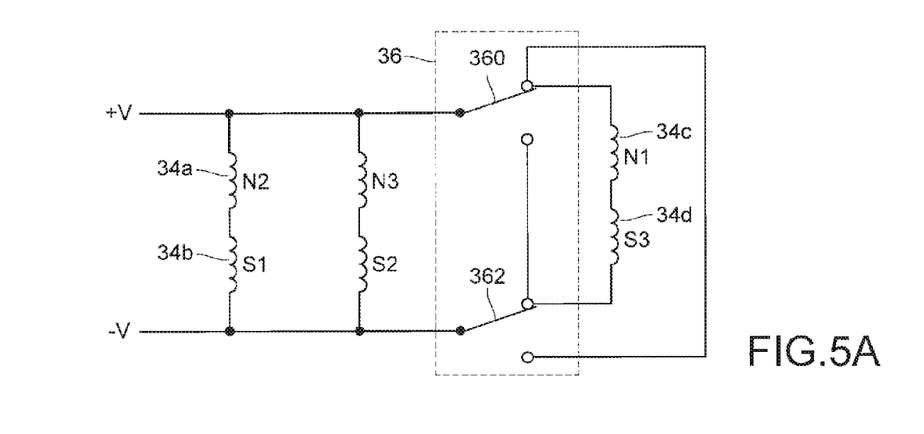
FIG. 5A is a schematic winding diagram of a stator of a magnetic transmission assembly according to another embodiment of the present invention.

In this embodiment, if it is intended to satisfy the Equations (2) and (3) at the same time without modifying the design of the magnetically conductive element 40 (but the Equation (3) needs to be slightly changed, to be detailed below), an embodiment of the stator 30 of FIGS. 5A and 5B can be used. FIG. 5A is a schematic winding diagram of a stator 30 of a magnetic transmission assembly according to another embodiment of the present invention, and FIG. 5B is a schematic view illustrating operation of the stator 30 of FIG. 5A according to another embodiment.

As can be seen from the figures, another embodiment of the stator 30 comprises a plurality of induction coils 34a, 34b, 34c, 34d and a pole number modulation circuit 36. The induction coils 34a, 34b, 34c, 34d are respectively wound about the bumps 32a, 32b. FIGS. 5A and 5B only depict the induction coils 34a, 34b, 34c, 34d of three pole pairs (N1, N2, N3, S1, S2, S3), but it is not intended that the stator 30 only comprises the coils 34a, 34b, 34c, 34d. The pole number modulation circuit 36 comprises two switches 360, 362. When the switches 360, 362 are in a state as shown in FIG. 5A and are connected to a power supply, the poles formed by the induction coils 34a, 34b, 34c, 34d present polarities as shown in FIG. 3, that is, the stator 30 has 12 pole pairs in total. When the switches 360, 362 are in a state as shown in FIG. 5B and are connected to a power supply, the induction coils 34c, 34d that originally form N1, S3 will form opposite poles due to the inversely connected power supply (that is, N1 is changed to a south magnetic pole, and S3 is changed to a north magnetic pole). FIG. 6 is a schematic view illustrating switching of pole pairs between FIGS. 5A and 5B.

Figure 5B:
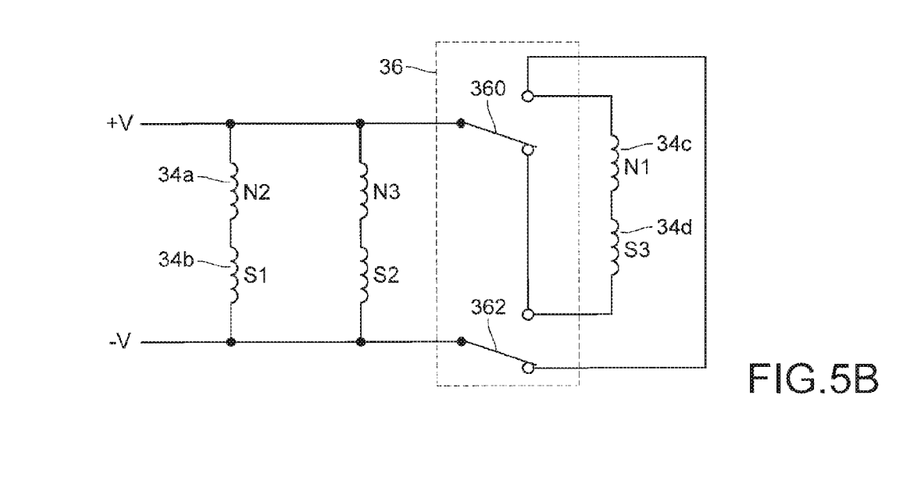
FIG. 5B is a schematic view illustrating operation of the stator of FIG. 5A according to another embodiment.
Figure 6:
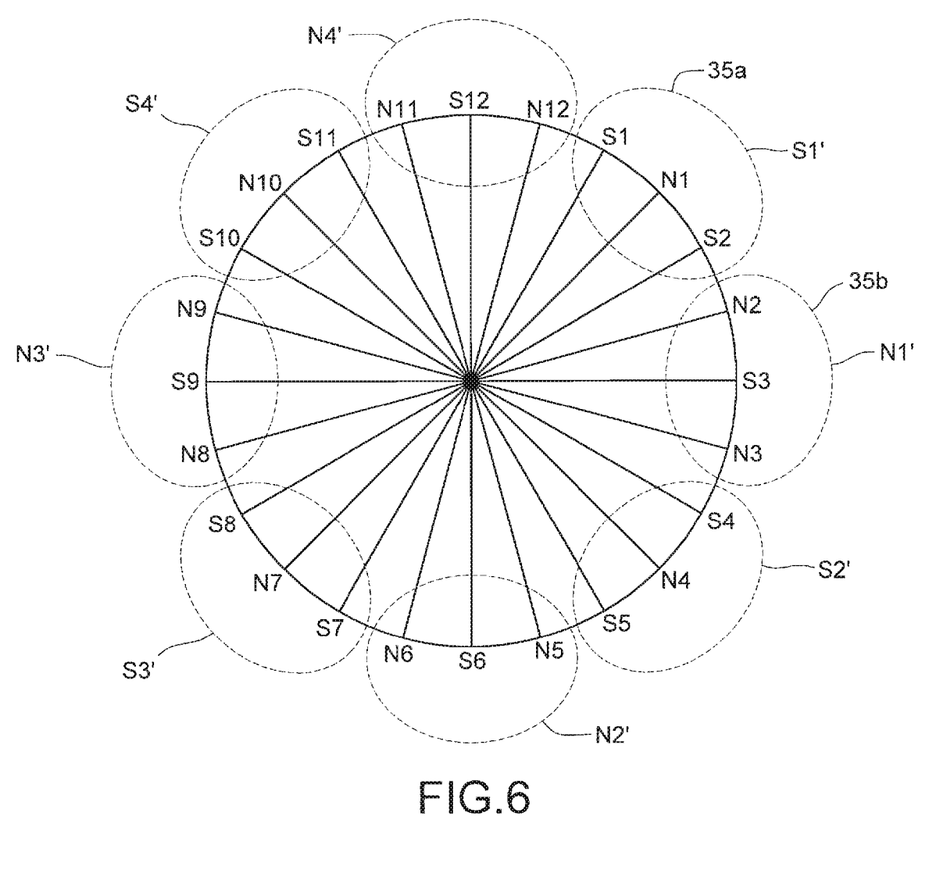
FIG. 6 is a schematic view illustrating switching of pole pairs between FIGS. 5A and 5B.

As can be seen from the figure, dashed line blocks represent schematic views of polarities of poles formed when the switches 360, 362 are in the state as shown in FIG. 5B. In the figure, N1, N4, N7, N10 are north magnetic poles in FIG. 5A, and S3, S6, S9, S12 are south magnetic poles in FIG. 5A, and at this time, the stator 30 has 12 (referred to as ST1 below) pole pairs in total (that is, N1, S1, N2, S3 . . . N12, S12). However, in FIG. 5B, due to the skillful design of the switches 360, 362 and circuits, the N1, N4, N7, N10 are changed into south magnetic poles after being energized, and S3, S6, S9, S12 are changed into north magnetic poles, with the other poles remaining unchanged; therefore, the stator 30 has 4 (referred to as ST2 below) pole pairs in total (as shown by dashed line blocks N1', S1', N2', S2', N3', S3', N4', S4'. In other words, when the induction coils 34a, 34b, 34c, 34d are switched to the ST1 pole pairs, the neighboring induction coils 34a, 34b, 34c, 34d have opposite polarities (magnetic polarities), and when the induction coils 34a, 34b, 34c, 34d are switched to the ST2 pole pairs, the induction coils 34a, 34b, 34c, 34d are grouped into a plurality of coil groups 35a, 35b, and the neighboring coil groups 35a, 35b have opposite polarities. In this embodiment, each of the coil groups 35a, 35b comprises three sequentially neighboring induction coils 34a, 34b, 34c, 34d. Here, the term "sequentially neighboring" means "connected", and for example, S1, N1, and S2 in FIG. 5B belong to the sequentially neighboring induction coils 34a, 34b, 34c, 34d.

Based on the above, the stator 30 is capable of selectively switching the induction coils 34a, 34b, 34c, 34d to 12 (ST1) pole pairs and 4 (ST2) pole pairs through the pole number modulation circuit 36. After the embodiment of the stator 30 of FIG. 5A is integrated with the switching of the number of the steel pieces of the magnetically conductive element 40, the variable-speed ratio (ratio of the rotation rate of the stator to the rotation rate of the rotor) can be obtained as shown in the following table, and the above Equation (2) and the following Equation (4) can be satisfied.

$$PN2-3 \leq R+ST2 \leq PN2+3 \quad \text{Equation (4)}$$

| | The magnetically conductive element is located at the first position, and the pole number modulation circuit is in the state as shown in FIG. 5B Variable-speed ratio (5:1) | The magnetically conductive element is located at the second position, and the pole number modulation circuit is in the state as shown in FIG. 5A Variable-speed ratio (1.6:1) |
|---|---|---|
| Stator | 4 | 12 |
| Magnetically conductive element | 24 | 32 |
| Rotor | 20 | 20 |

Although the pole number modulation circuit 36 merely takes the embodiment of FIG. 5A as an example, the present invention is not limited thereto. Through a proper circuit and switch design, the number of the pole pairs of the stator 30 may be increased or reduced at different ratios.

Figure 7A:
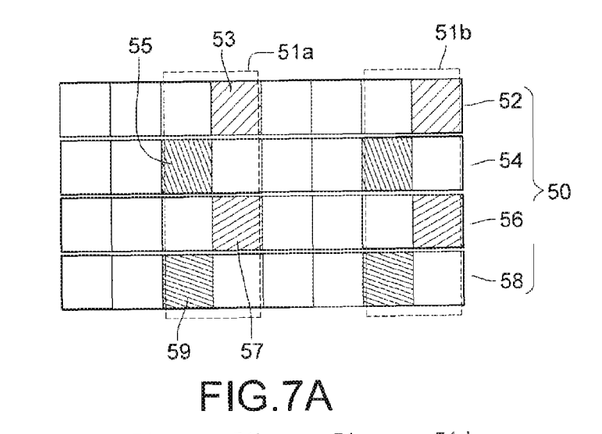
FIGS. 7A and 7B are schematic views of a magnetically conductive element of a magnetic transmission assembly according to another embodiment of the present invention.
Figure 7B:
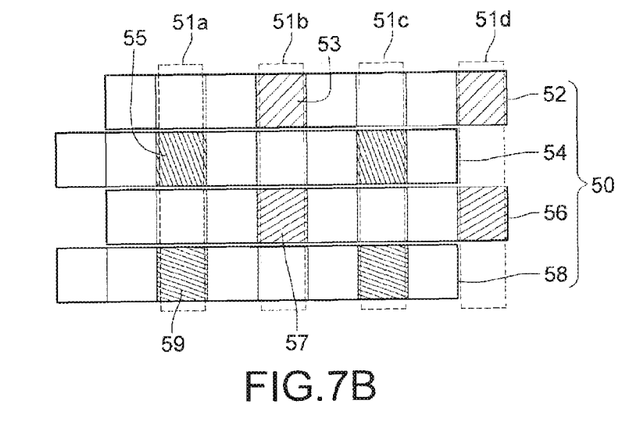
Figure 8:
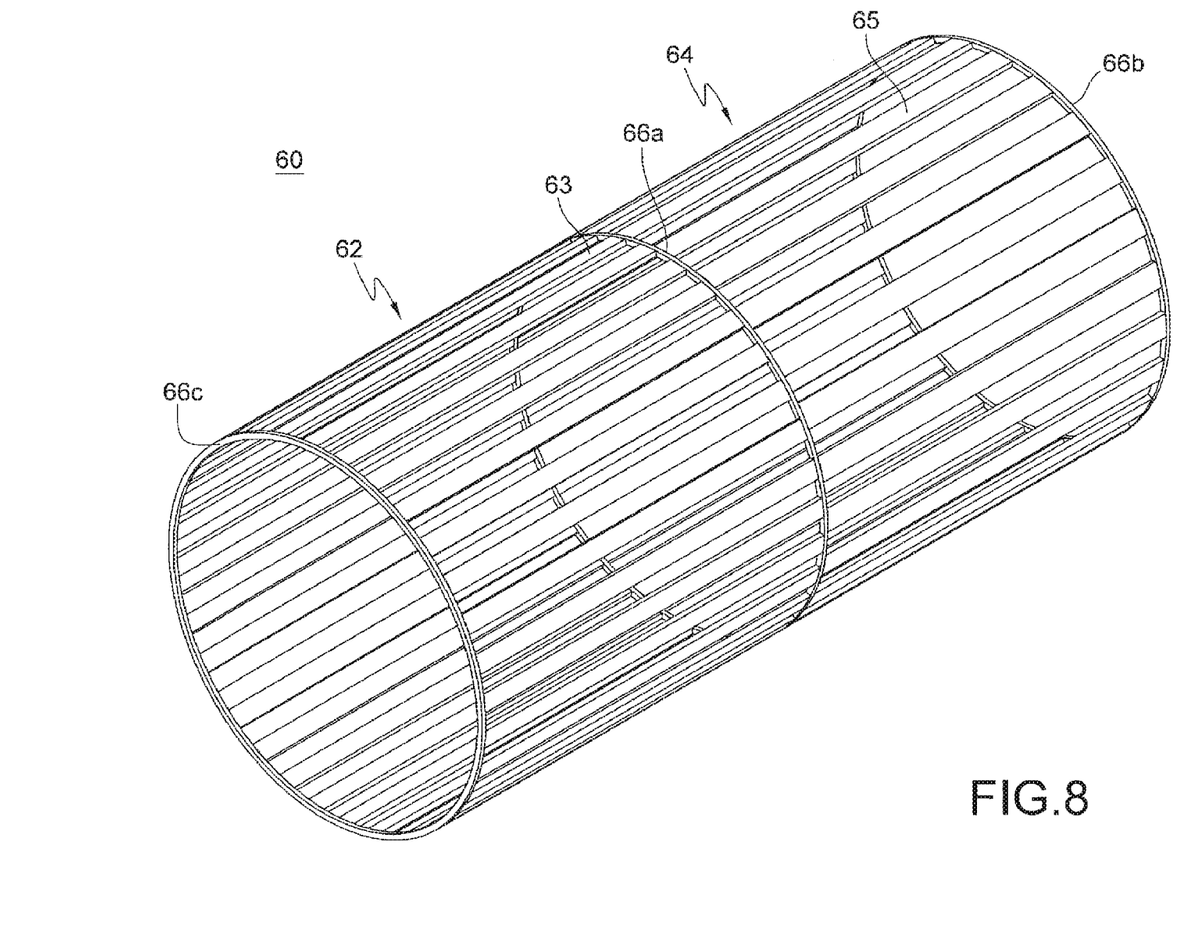
FIG. 8 is a schematic view of a magnetically conductive element of a magnetic transmission assembly according to still another embodiment of the present invention.

For other embodiments of the magnetically conductive element 40 of FIG. 4A, reference may be made to FIGS. 7A, 7B, and 8. The magnetically conductive element 50 of FIGS. 7A and 7B is similar to that in FIG. 4B. As can be seen from the figures, the magnetically conductive element 50 comprises a first ring 52, a second ring 54, a third ring 56, and a fourth ring 58. The first ring 52, the second ring 54, the third ring 56, and the fourth ring 58 overlap each other in a radial direction and respectively have magnetically conductive blocks 53, 55, 57, 59. When the magnetically conductive element 50 is located at a position of FIG. 7A (the first position), the magnetically conductive blocks 53, 55, 57, 59 are in a connection relation, such that the arc segment has two steel pieces 51a, 51b and two magnetic gaps (the magnetic gap is a gap spaced by the steel pieces in a circumferential direction). When the magnetically conductive element 50 is located at a position of FIG. 7B (the second position), the magnetically conductive blocks 53, 55, 57, 59 are separated from each other, such that the arc segment has four steel pieces 51a, 51b, 51c, 51d and four magnetic gaps.

The magnetically conductive elements 40, 50 of FIGS. 4A and 7A also adopt a plurality of annular (cylindrical) magnetically conductive rings (that is, the first ring 42, 52 and the like) overlapping each other in a radial direction, and the number of the magnetically conductive rings may vary depending on practical design requirements, that is, three or five magnetically conductive rings may be combined together, but the present invention is not limited thereto. The size, arrangement and number of the magnetically conductive blocks in the magnetically conductive rings may also be properly designed so as to generate different numbers of magnetic gaps, thereby achieving the required variable-speed ratio.

FIG. 8 is a schematic view of a magnetically conductive element of a magnetic transmission assembly according to still another embodiment of the present invention. The magnetically conductive element 60 comprises a first ring 62 and a second ring 64. The first ring 62 and the second ring 64 are axially connected. The magnetically conductive element 60 is disposed between the stator 30 and the rotor 20. The first ring 62 and the second ring 64 are capable of moving axially into the gap between the stator 30 and the rotor 20, such that only one of the first ring 62 and the second ring 64 is sandwiched between the stator 30 and the rotor 20 at a time. In short, when the magnetically conductive element 60 is axially actuated, the magnetically conductive element 60 selectively enables the first ring 62 or the second ring 64 to be moved to a position between the rotor 20 and the stator 30. As such, the sandwiched first ring 62 or second ring 64 can interact with magnetic fields of the stator 30 and the rotor 20 to generate a particular variable-speed ratio. The number of magnetically conductive blocks 63 of the first ring 62 (for example, PN1 magnetically conductive blocks) is different from the number of magnetically conductive blocks 65 of the second ring 64 (for example, PN2 magnetically conductive blocks). In the embodiment of FIG. 8, the number of the magnetically conductive blocks 63 of the first ring 62 is 32, and the number of the magnetically conductive blocks 65 of the second ring 64 is 24, that is, the magnetically conductive element 60 is suitable for replacing the magnetically conductive element 40 in the embodiment of FIG. 1.

As mentioned above, the first ring 62 and the second ring 64 are axially connected. Please refer to FIG. 8 again. The first ring 62 and the second ring 64 are axially connected to each other through an electrical insulating element 66a. In addition, two electrical insulating elements 66b, 66c are respectively connected to the two outer sides of the first ring 62 and the second ring 64 for fixing the magnetically conductive blocks 65 of the second ring 64 and the magnetically conductive blocks 63 of the first ring 62.

Figure 9:
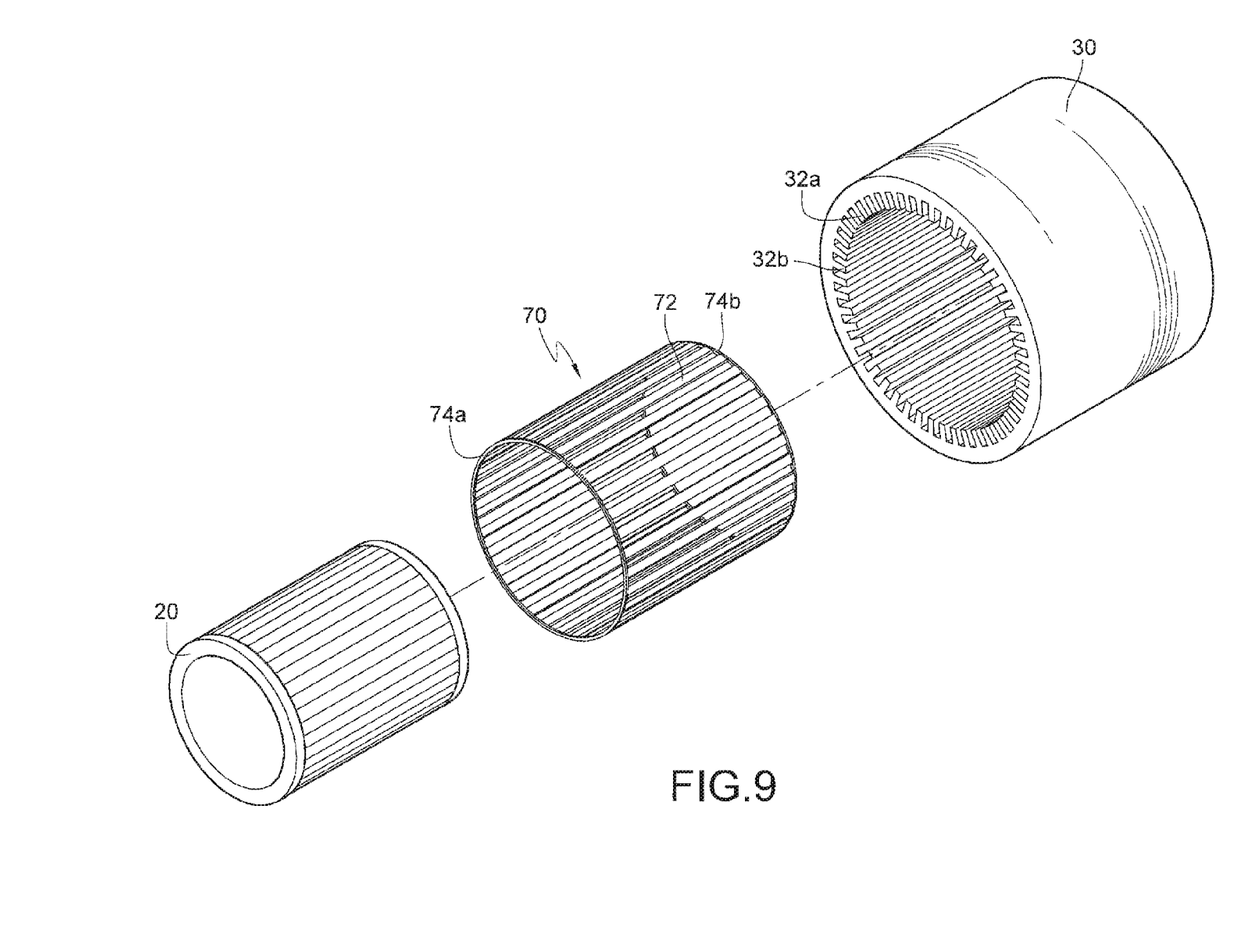
FIG. 9 is a three-dimensional schematic exploded view of a magnetic transmission assembly according to a still another embodiment of the present invention.

Furthermore, please refer to FIG. 9. FIG. 9 is a three-dimensional schematic exploded view of a magnetic transmission assembly according to a still another embodiment of the present invention. As can be seen from the figure, a magnetic transmission assembly comprises a rotor 20, a stator 30, and a magnetically conductive element 70. The rotor 20 has a plurality of poles and the poles of the rotor 20 have R pole pairs. The stator 30 is sleeved coaxially with the rotor 20 and has a plurality of poles. The poles of the stator 30 have ST1 pole pairs. The magnetically conductive element 70 is disposed between the rotor 20 and the stator 30 and has PN1 steel pieces 72. The PN1 steel pieces 72 correspond to the rotor and the stator. PN1−3≦R+ST1≦PN1+3. Accordingly, if R is 20, PN1 is 32 and ST1 is 12, the acceleration ratio or deceleration ratio would be 1.6:1 according to the above Equation (1).

Next, the two ends of the steel pieces 72 are fixed by two electrical insulating elements 74a, 74b as shown in FIG. 9. By means of disposition of the electrical insulating elements 74a, 74b, the induced current generated by the steel pieces 72 cutting the magnetic fields of the rotor 20 and the stator 30 is insulated within each of the steel pieces 72.

According to the embodiment in FIG. 9, the magnetically conductive element 70, the stator 30 and the rotor 20 each have a hollow annular shape, such that the entire magnetic transmission assembly has small volume and weight, and can be easily integrated into an electric motor. Consequently, the drive power density (W/Kg or W/m$^3$) of the integrated motor is increased.

According to the above embodiments, through different implementations of the magnetically conductive elements 40, 50, 60, the magnetic transmission assembly can switch to different variable-speed ratios. Then, if the number of the steel pieces 46a, 46b, 51a, 51b, 51c, 51d of the magnetically conductive elements 40, 50, 60 that can be switched cannot satisfy the Equations (2) and (3), the implementation of the stator 30 of FIG. 5A may be adopted (the Equations (2) and (4) are satisfied), such that the stability under different variable-speed ratios can be improved.

Moreover, since the magnetic transmission assembly in the embodiments comprises a design of a stator and a rotor of an electric motor or a generator, has a design of a transmission structure, and is easily integrated with a motor driver of the electric motor or an electricity generating circuit (for example, a rectification and voltage regulation voltage or the like) of the generator to form a variable speed electric motor or a variable speed generator. The integrated variable speed electric motor has both a function of generating a rotary power and a function of variable speed transmission, but the volume and weight thereof are only about the original volume and weight of the electric motor, such that a high drive power density is achieved. Meanwhile, the magnetic transmission assembly adopts electromagnetic transmission, and thus has reduced vibration and noise level. Furthermore, when applied in the industry of electric automobiles, the variable speed electric motor can meet the requirements of different torques and travel speeds while maintaining high performance operation.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A magnetic transmission assembly, comprising:
   a rotor, having a plurality of poles, wherein the poles of the rotor have R pole pairs;
   a stator, sleeved coaxially with the rotor, and having a plurality of poles, wherein the poles of the stator have ST1 pole pairs; and
   a magnetically conductive element, disposed between the rotor and the stator, and having a plurality of steel pieces, wherein the magnetically conductive element comprises both PN1 and PN2 steel pieces, when the magnetically conductive element is actuated, the magnetically conductive element selectively enables PN1 or PN2 steel pieces to be corresponding to the rotor and the stator, and $PN1-3 \leqq R+ST1 \leqq PN1+3$.

2. The magnetic transmission assembly according to claim 1, wherein $PN2-3 \leqq R+ST1 \leqq PN2+3$.

3. The magnetic transmission assembly according to claim 1, wherein the magnetically conductive element comprises a first ring and a second ring, the first ring and the second ring are axially connected, the first ring has PN1 magnetically conductive blocks, the second ring has PN2 magnetically conductive blocks, and when the magnetically conductive element is axially actuated, the magnetically conductive element selectively enables the first ring or the second ring to be moved to a position between the rotor and the stator.

4. The magnetic transmission assembly according to claim 1, wherein the magnetically conductive element comprises a first ring and a second ring, the first ring is located on a radial outer side of the second ring, the first ring and the second ring are disposed between the stator and the rotor, when the magnetically conductive element is actuated, the first ring and the second ring move relatively between a first position and a second position, when the first ring and the second ring are located at the first position, the magnetically conductive element has PN1 steel pieces, and when the first ring and the second ring are located at the second position, the magnetically conductive element has PN2 steel pieces.

5. The magnetic transmission assembly according to claim 1, wherein the stator comprises a plurality of induction coils, and the induction coils are energized to form the poles.

6. The magnetic transmission assembly according to claim 5, wherein the stator further comprises a pole number modulation circuit, and the pole number modulation circuit selectively switches the induction coils to the ST1 pole pairs and ST2 pole pairs.

7. The magnetic transmission assembly according to claim 6, wherein the stator further comprises a plurality of annularly disposed bumps, the induction coils are respectively wound about the bumps, when the induction coils are switched to the ST1 pole pairs, the neighboring induction coils have opposite polarities, and when the induction coils are switched to the ST2 pole pairs, the induction coils are grouped into a plurality of coil groups, and the neighboring coil groups have opposite polarities.

8. The magnetic transmission assembly according to claim 7, wherein $PN2-3 \leqq R+ST2 \leqq PN2+3$.

9. The magnetic transmission assembly according to claim 7, wherein each of the coil groups comprises three sequentially neighboring induction coils.

10. The magnetic transmission assembly according to claim 7, wherein the magnetically conductive element comprises a first ring and a second ring, the first ring and the second ring are axially connected, the first ring has PN1 magnetically conductive blocks, the second ring has PN2 magnetically conductive blocks, and when the magnetically conductive element is axially actuated, the magnetically conductive element selectively enables the first ring or the second ring to be moved to a position between the rotor and the stator.

11. The magnetic transmission assembly according to claim 7, wherein the magnetically conductive element comprises a first ring and a second ring, the first ring and the second ring are in radial contact and are sandwiched between the stator and the rotor, when the magnetically conductive element is actuated, the first ring and the second ring move relatively between a first position and a second position, when the first ring and the second ring are located at the first position, the magnetically conductive element has PN1 steel pieces, and when the first ring and the second ring are located at the second position, the magnetically conductive element has PN2 steel pieces.

* * * * *